United States Patent [19]

Trumbo

[11] Patent Number: 5,180,891
[45] Date of Patent: Jan. 19, 1993

[54] DIGITIZER TABLET WITH INTERNALLY STORED WIRELESS STYLUS

[75] Inventor: Brian A. Trumbo, Boynton Beach, Fla.

[73] Assignee: International Business Machines Corporation, Armonk, N.Y.

[21] Appl. No.: 778,542

[22] Filed: Oct. 17, 1991

[51] Int. Cl.[5] .............................................. G08C 21/00
[52] U.S. Cl. ........................................ 178/18; 178/87
[58] Field of Search ............................ 178/87, 18, 19

[56] References Cited

U.S. PATENT DOCUMENTS 4,927,986 5/1990 Daly ...................................... 178/18

OTHER PUBLICATIONS

Neal Boudette, "NCR Fine-Tunes Its First Stylus PC" PC Week, May 27, 1991, vol. 8, No. 21, p. 1.
Itt Schadow Catalog, "Pushbutton Switches Introduction PVA PHA F/LT Serier", p. 75.

Primary Examiner—Stafford D. Schreyer
Attorney, Agent, or Firm—G. E. Grosser; D. R. McKechnie

[57] ABSTRACT

A wireless stylus includes a pocket clip having a latch which, upon insertion into a storage compartment within a digitizer, engages a cam. The cam has a shape that causes the latch to move into engagement with a keeper as the stylus is pushed into the compartment and then released. The keeper holds the stylus in a stored position. The latch is released upon first pushing the stylus and then releasing it. Biasing means engages the stylus and moves it against the keeper and ejects the stylus outwardly from the storage compartment allowing the stylus to be grasped and withdrawn from the tablet. The storage compartment is open at opposite ends and has two cams, one at each end of the compartment so that the stylus, at the convenience of the user, can be inserted into either end for storage.

18 Claims, 4 Drawing Sheets

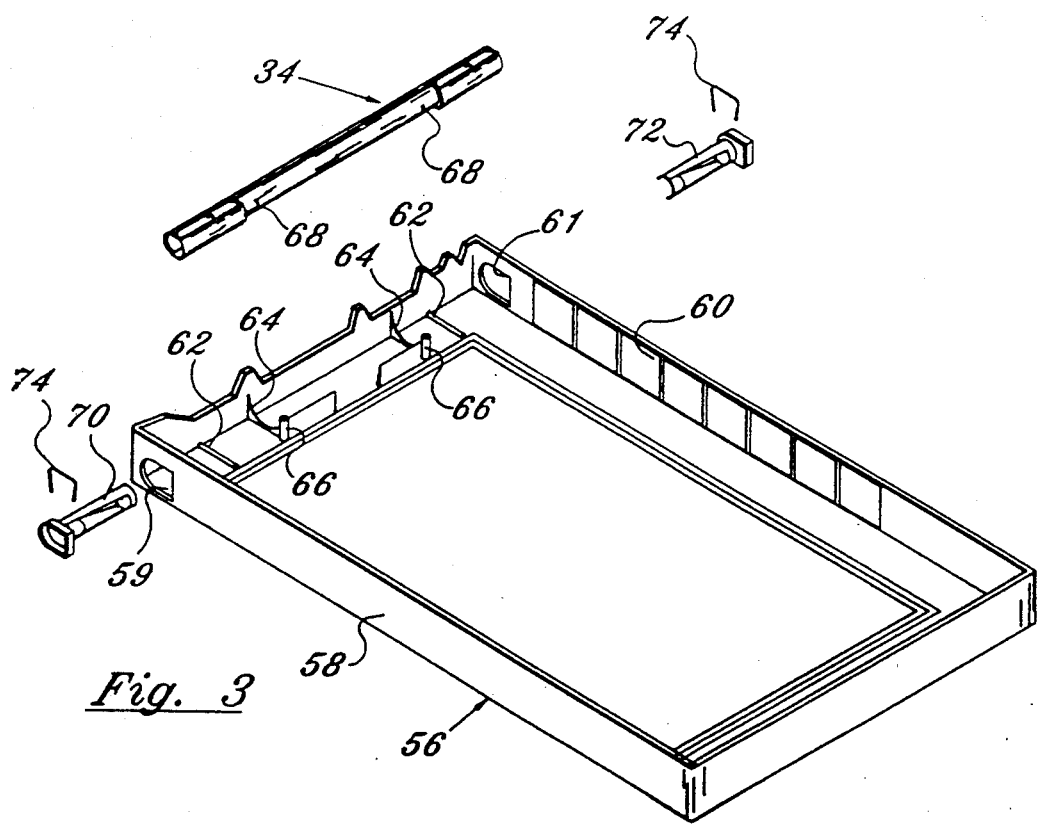
Fig. 3
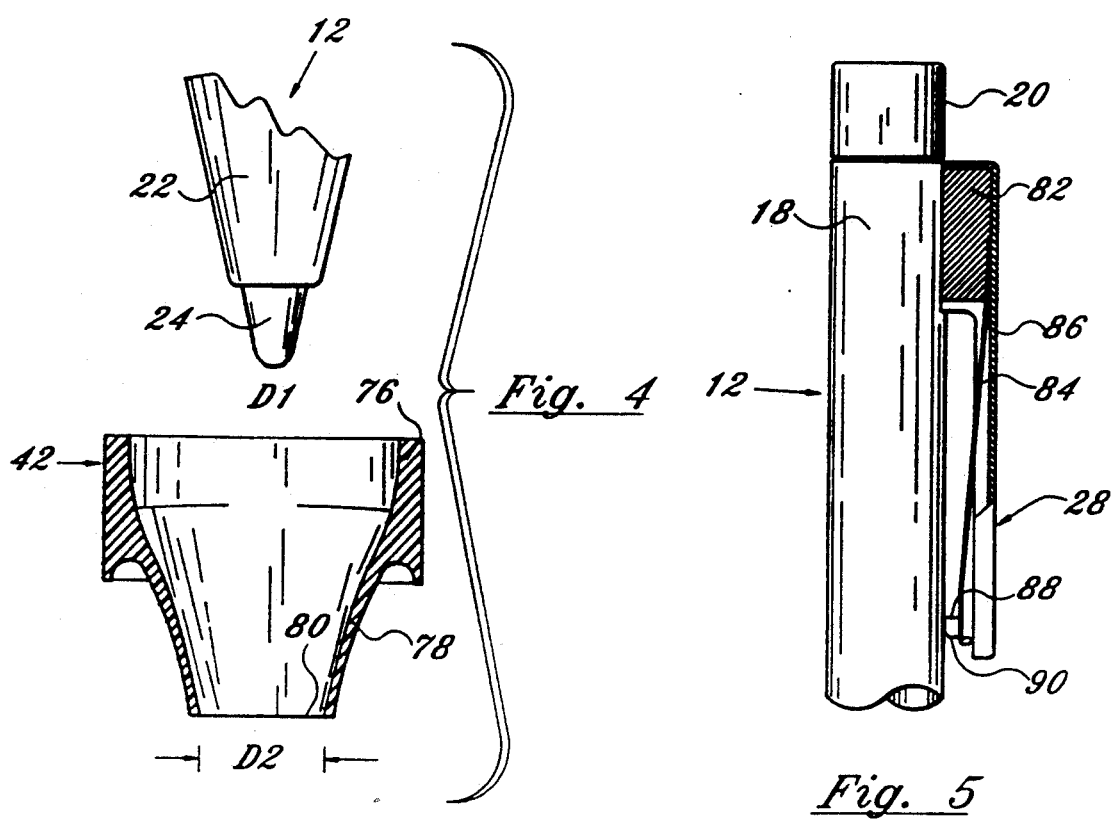
Fig. 4
Fig. 5

5,180,891

DIGITIZER TABLET WITH INTERNALLY STORED WIRELESS STYLUS

FIELD OF THE INVENTION

This invention relates to data processing apparatus and, more particularly, to an improved digitizer tablet and wireless electronic stylus whereby the stylus can be stored within the tablet when not in use.

BACKGROUND OF THE INVENTION

A digitizer tablet is a form of an input device by means of which information can be inputted into a data processing system such as a personal computer. The tablet has a work face covering a grid of wires. Information is entered by moving an electronic stylus over the surface of the work face. The stylus contains an electromagnet which inductively interacts with the grid of wires to produce signals indicating the position of the stylus. The tablet also contains a liquid crystal display in which, as such signals are produced by movement of the stylus in proximity to the wire grid, liquid crystal pixels are selectively actuated to present to the user a visual display indicating where the stylus has moved over the work face. Digital signals indicating the position of the stylus are also inputted into a data processing system and stored therein.

The electronic stylus may be wireless in the sense that no wires nor cable physically connects or tethers the stylus to the tablet, and this poses a problem which the present invention addresses. The problem is that the stylus is relatively expensive while being relatively small and easy to lose or misplace if care is not exercised in storing the stylus when it is not being used. This problem appears to be known in the art but the solutions to it are different from the invention. For example, PC Week, Vol. 8, No. 27, page 1, May 27, 1991 shows a tablet and a wireless stylus that is stored in a compartment running along one side of the tablet. The compartment is covered by a door and the stylus appears to be loosely placed in the compartment for storage.

SUMMARY OF THE INVENTION

Accordingly, one of the objects of the invention is to provide an improved digitizer tablet and stylus which allow the stylus to be stored in the tablet in a simple and convenient manner so as to minimize the chances of the user either misplacing or losing the stylus when it is not being used.

Another object of the invention is to provide an improved digitizer tablet and stylus whereby the stylus can simply be pushed into the tablet for storage and thereafter pushed again to remove the stylus from the tablet for use.

A further object of the invention is to provide a storage compartment within a tablet, which compartment includes a latch mechanism that interacts with a stylus placed in the compartment so as to prevent the stylus from falling out of the compartment as the tablet is tilted or carried about.

Still another object of the invention is to provide a relatively inexpensive tablet with a stylus storage mechanism that can be readily and cheaply assembled and manufactured.

A still another object of the invention is to provide an electronic stylus and tablet whereby the stylus can be placed into a storage compartment by pushing the stylus into the compartment and engaging a latch mechanism that can be readily released by further pushing the stylus.

A still further object of the invention is to provide a stylus storage mechanism in which removal of the stylus from storage is facilitated by a mechanical bias.

Another object of the invention is to provide a stylus with a pocket clip which forms a latch that is cooperative with a keeper in the tablet to releasibly latch the stylus in a storage position within the tablet.

Another object is to provide a digitizer tablet with a storage compartment which can be accessed from two opposite sides of the tablet to present to the user a choice of two positions in which the stylus can be stored.

Briefly, in accordance with the invention, a wireless stylus includes a pocket clip having a latch which, upon insertion into a storage compartment within a digitizer, engages a cam. The cam has a shape that causes the latch to move into engagement with a keeper as the stylus is pushed into the compartment and then released. The keeper holds the stylus in a stored position. The latch is released upon first pushing the stylus and then releasing it. Biasing means engages the stylus and moves it against the keeper and ejects the stylus outwardly from the storage compartment allowing the stylus to be grasped and withdrawn from the tablet.

DRAWINGS

Other objects and advantages of the invention will be apparent from the following description taken in connection with the accompanying drawings wherein:

FIG. 3 is a an exploded isometric view of a tablet base, storage tube, and cams;

FIG. 4 is an enlarged elevational view, partly in section, showing an interactional feature between the stylus and a portion of biasing means shown in FIG. 2;

FIG. 5 is a plan view partly in section of the stylus pocket clip shown in FIG. 1;

DETAILED DESCRIPTION

Figure 1:
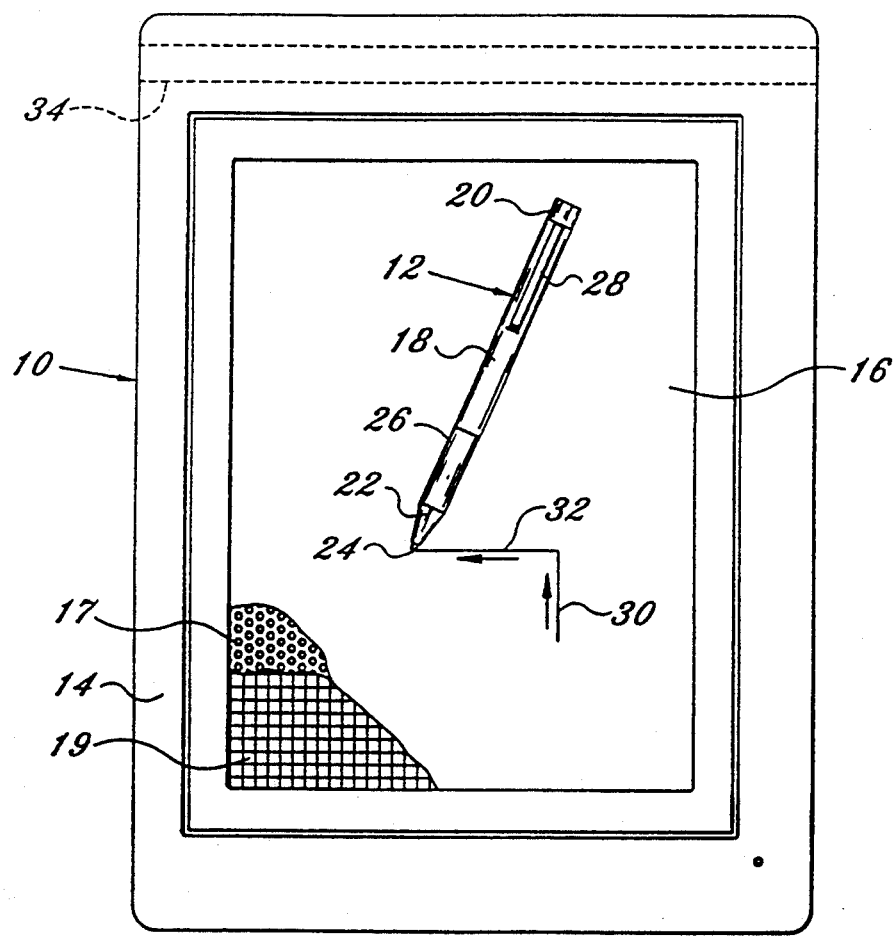
FIG. 1 is an isometric view of a digitizer tablet and wireless stylus constructed in accordance with a preferred embodiment of the invention, which view shows how the stylus is used to input information into the tablet.

Referring now to the drawings, and first to FIG. 1, a digitizer tablet 10 is actuated by a wireless electronic stylus 12 to generate information that can be inputted into a data processing system (not shown). Tablet 10 comprises a rectangular housing 14 containing an LCD 16 which may be of conventional construction including a multiplicity of liquid crystals forming pixels 17, an orthagonal grid 19 of wires, and circuits (not shown) for detecting the position of the stylus and illuminating pixels in the LCD in accordance therewith. Tablet 10 can be used in portrait position, as illustrated in FIG. 1, or in a landscape position. The tablet may be held in on arm, on a user's lap, or on a desk top.

Stylus 12 comprises an elongated cylindrical body 18 having a cap 20 at one end which can be removed to expose a battery compartment therein. The other end 22 of body 18 is tapered and has an axial hole therein through which a movable, cylindrical stylus tip 24 extends. Tip 24 extends into body 18 and is surrounded by coil (not shown), tip 24 being of magnetic material to form an armature of an electromagnet. The tip is biased downwardly and is connected to a normally closed switch (not shown). When the stylus is pressed against the work face, the switch is opened allowing a power supply circuit to cause current to flow from the battery through the coil and generate a magnetic field in the vicinity of the tip. By moving stylus 12 over work face 16, voltages are induced in the grid which are then analyzed by circuitry in tablet 10 to determine the position of the stylus and illuminate pixels in accordance therewith. Body 18 also includes a plurality of circular grooves 26 forming a grip to facilitate manually holding and moving stylus 12. As illustrated in FIG. 1, stylus 12 has been moved with tip 24 engaged with work face 16 create two exemplary lines 30 and 32 on the LCD. As described thus far, the tablet and stylus may be of conventional construction.

Stylus 12 includes a pocket clip 28 near the upper end thereof which can be used in conventional fashion to fasten the stylus in a user's pocket. In accordance with a novel feature of the invention, clip 28 also functions as a latch, as described in greater detail below, for releasibly storing stylus 12 in a storage compartment 34.

Figure 2:
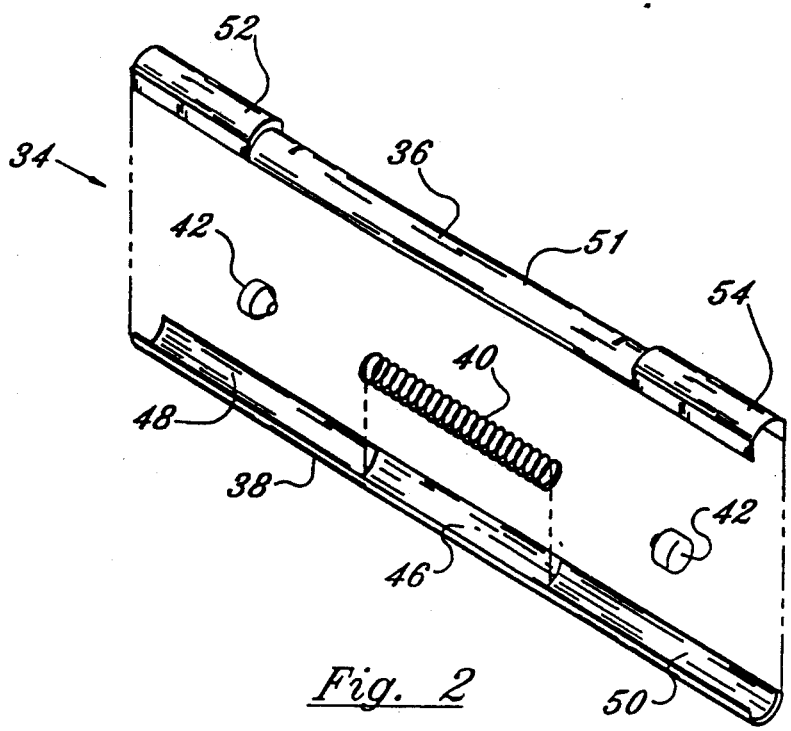
FIG. 2 is an exploded, isometric view of a storage tube which view is on an enlarged scale relative to that of FIG. 1.

Referring to FIG. 2, compartment 34 is assembled from two semicylindrical halves 36 and 38 which enclose a compression spring 40 and two pistons 42 located at opposite ends of the spring. Each half comprises a medial wall 46 having an inner radius of curvature greater than the radii of curvature of two end portions 48 and 50. Pistons 42 have outer radii of curvature slightly less than the inner radius of curvature of portion 46 so that the pistons can move within portion 46. Compartment 34 is assembled by placing spring 40 and pistons 42 against one half (e.g. 38 and then welding the other half (e.g. 36) along its longitudinal edges to half 38. When thus assembled, compartment 34 appears as shown in FIG. 3 and has an elongated tubular shape. Half 38 has a semicircular cross section along its length whereas half 36 has a medial portion 51 of semicircular cross section and two end portions 52 and 54 of U-shaped cross section. When the two halves are joined, the medial portion of compartment 34 is of circular cross section while the end portions are of D-shaped cross section.

Referring to FIG. 3, the tablet includes a base 56 having upstanding opposite side walls 58 and 60 respectively provided with openings 59 and 61 therein. Compartment 34 has a length approximately the same as the spacing between openings 59 and 61 so that the compartment can be placed between the side walls in alignment with such openings. Two straight ribs 62 are formed on base 62 beneath the compartment and cooperate with flat faces of the end portions of the compartment so as to square up and align the compartment in the base. Two arcuate cradles 64 underlie and support compartment 34. The cradles are attached on inner ends to bosses 66 used for mounting the LCD in the base. Compartment 34 has two slots 68 which abut bosses 66 and aid in aligning the compartment in the base. Two cam members 70 and 72 are inserted into opposite ends of compartment 34 through openings 59 and 61 and are held in place by two clips 74.

Referring to FIG. 4, Each piston 42 has a hollow cylindrical end 76 joined to a hollow conical section 78, the end of which terminates in a opening 80 coaxial with the axis of piston 42. The diameter D1 of tip 24 is less than the diameter D2 of opening 80 so that when stylus is pushed into the storage compartment against one of pistons, the inner surface will guide end 22 along the axis of the piston and force tip 24 through opening 80 along the axis thereof without opening the switch in stylus 12 and thereby draining the battery while the stylus is being stored.

As shown in FIG. 5, clip 28 of stylus 12 comprises a mounting block 82 extending laterally from body 18. A cantilever spring 84 has one end snap fitted into block 82 away from body 18. Block 82 and the end of spring 84 are covered by a cap 86. Cap 86 extends along the stylus parallel to body 18 and is relatively rigid. Spring 84 has a cylindrical tip 88 mounted of its other end and biased by the spring into engagement with body 18. Tip 88 has a beveled edge to facilitate insertion into a user's pocket or into either end of compartment 34 as described in detail below. Tip 88 also functions as a latch, also as described in detail hereafter.

Figure 6:
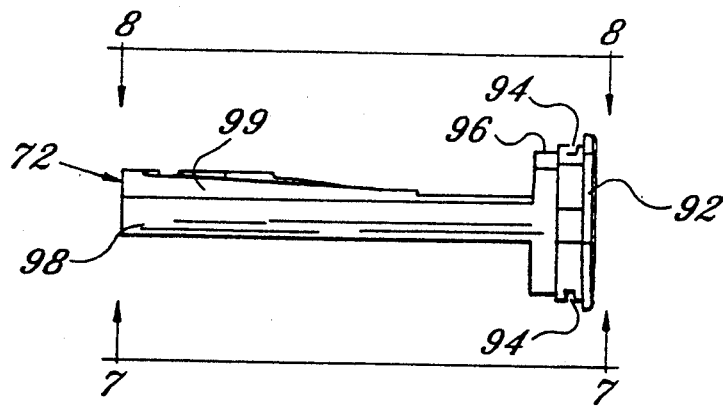
FIG. 6 is an enlarged, top plan view of one of the cams shown in FIG. 3.

Cams 70 and 72 are bilaterally symmetrical and only one needs to be described in detail. With reference to FIG. 6, cam 72 has a ring shaped, flanged head 92 which when the cam is assembled abuts the outer surface of side wall 60 (FIG. 3). Head 92 has slots 94 for receiving the retaining clip 74 (FIG. 3). Cam 72 also has a ring 96 of reduced cross section relative to head 92. Ring 96 has an external surface of a shape similar to a mating inner surface of end portion 54 (FIG. 2) so that the ring readily slides into such end portion during assembly. A pair of parallel side walls 98 extend to the left from ring 96 as viewed in FIGS. 6–8 and have a flat straight outer surfaces that slide along corresponding flat inner surfaces of portion 54. The irregular shapes of the mating surfaces of cam 72 and portion 54 align the cam with the storage compartment so that they cam be assembled in only one orientation with correct alignment.

Figure 7:
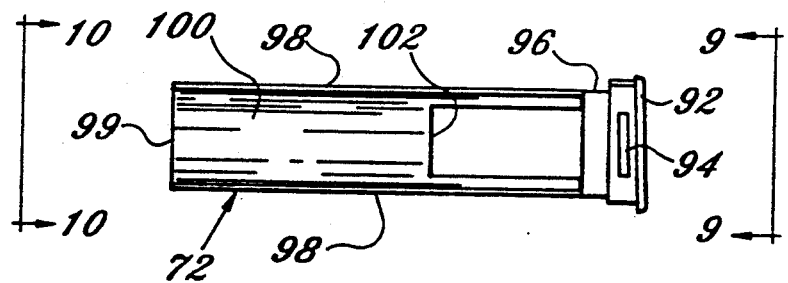
FIG. 7 is a side elevational view of the cam looking along reference lines 7—7 of FIG. 6.
Figure 10:
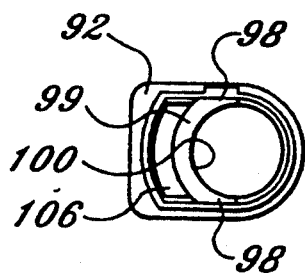
FIG. 10 is an end elevational view looking along reference lines 10—10 of FIG. 7.
Figure 9:
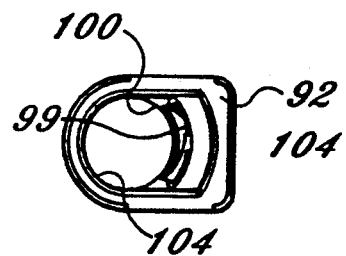
FIG. 9 is an end elevational view looking along reference lines 9—9 of FIG. 7.

As best seen in FIG. 7 and 10, a generally cylindrical body or web 99 extends between the inner ends of sides 98 and has an inner surface 100 of semicircular cross section having a radius of curvature slightly greater than the radius of body 18 of stylus 12. As best seen in FIG. 9, head 92 and ring 96 have a D-shaped bore 104 therethrough, the bore including a semicylindrical of a radius of curvature the same as that of surface 100 and oriented 180 degrees relative thereto. When viewed from either end, cam 72 appears to have a circular bore of a diameter slightly greater than the than the diameter of body 18 whereby the stylus can readily be longitudinally moved into an out of the storage compartment through cam 72. The right hand portion of head 92 and ring 96, as viewed in FIG. 10, is U-shaped and spaced radially outwardly relative to the outer surface of web 99 to provide a gap 104 allowing clip 28 to pass therethrough when the stylus is inserted. The semicircular surface of head 92 and ring 94 and semicircular surface 100 contact the body 18 of the stylus and guide the stylus into and out of the storage compartment.

Figure 8:
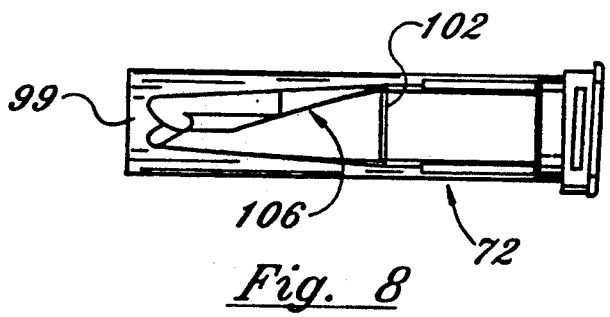
FIG. 8 is a side elevational view of the cam looking along reference lines 8—8 of FIG. 6.
Figure 11:
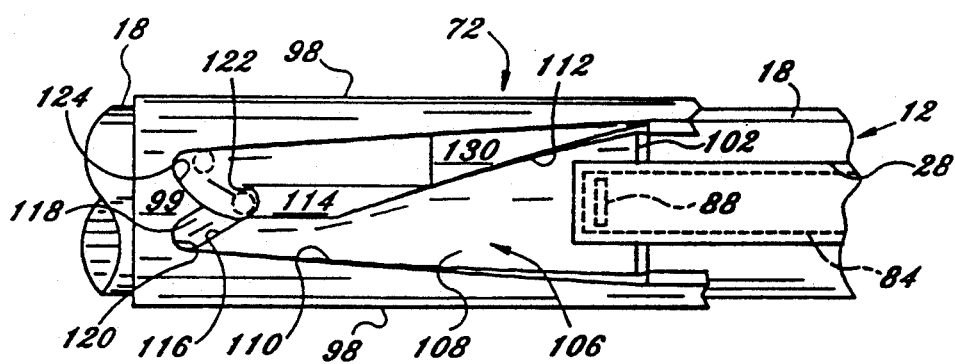
FIG. 11 is a greatly enlarged side elevational view illustrating/further details of the cam and certain interaction between the stylus and the cam.

Body 99 ends or terminates at a beveled edge 102 to form a gap or opening between web 99 and ring 96. The bevel faces radially outwardly as best seen in FIGS. 8 and 11 to lift or separate tip 88 from the body 18 as stylus is inserted into storage compartment 34 through cam 72. The outer surface of web 99 is formed into a cam track 106 shown in greatly enlarged detail in FIG. 11, to which reference will now be made. In order to insert the stylus, it must be rotated or positioned so that clip 28 is generally aligned with edge 102. Thus, when the stylus is then pushed into the tablet, tip 88 on spring 84 is lifted off body 18 by the bevel of edge 102 and moves against the bias of the spring to thereby increase the bias force. Tip 88 acts as a cam follower for guiding itself along cam track 106 and it also acts as a latch for holding the stylus in its storage position. Thus, item 88 is also referred to hereafter as "latch" 88.

As latch 88 moves over edge 102, it moves upon an entrance ramp 108 bounded by upstanding side walls 110 and 112 which confine the movement of latch 88 to sliding along ramp 108 and through a narrowed down throat terminating in a dropoff edge 116. The bottom of latch moves over edge 116 and moves or drops under the bias of spring 84 into contact with a ledge 118. This ledge is bounded by edge 116 and a rear wall 120 that acts as a stop to limit further inward movement of the stylus. During the course of inward movement of stylus 12, the movement is done against the bias of spring 40 (FIG. 2). Once latch has moved against stop 120, the user can release stylus allowing spring 40 to move the stylus outwardly into the storage position. During the course of such movement, edge 116 guides latch 88 until it comes to rest in the storage position against keeper 122 formed on the inward edge of island 114. Keeper 122 has an inwardly facing arcuate edge terminating with an inwardly facing cusp that prevents lateral movement of latch 88. As the latch moves from the stop position to the storage position, it passes over a second dropoff edge 124 and moves against a surface 126 the lowest portion of which is adjacent keeper 112.

In order to remove the pen from storage, the user must first push the stylus inwardly causing latch 88 to move along wall 124. The inner end of wall 124 forms a stop wall. The user must then cease pushing the stylus and release it to allow spring 40 to move the stylus longitudinally outwardly from the storage compartment. Surface 128 is formed into an exit ramp that leads into a cylindrical surface 130 of constant radial height that is radially higher than entrance ramp 108 and separated therefrom by walls or edge 112. As the stylus thus moves out of the storage compartment, latch 88 slides along ramp 128 and surface 130, drops off edge 112 onto ramp 110, and then passes over edge 102 to move against body 18 of the stylus. During the course of movement through cam track 106, the latch moves laterally and this causes concurrent rotation of the stylus.

In summary, the invention provides a storage mechanism which allows the user to store the stylus in either one of two different positions. The user can select the position most convenient. Further, the user can store the stylus and remove it by simple push, push movements, the first push being to move the stylus into the compartment until it hits a stop whereupon the user can release the stylus allowing the stylus to be moved by spring 40 into the storage position. The second push is much shorter than the first and causes the stylus to move from its storage position until it hits a stop whereupon the user can release the stylus allowing it to be moved outwardly out of the storage compartment until the end thereof can be manually grasped to completely withdraw the stylus from inside the tablet.

Keeper 122 is located centrally on the web, and the cam track 106 forms two paths extending along either side of the keeper, an entrance path and an exit path. The stop walls 120 and 124 are longitudinally and laterally spaced from the keeper and edges or cam walls 116 and 124 produce the lateral movement which causes the stylus to rotate.

It should be apparent to those skilled in the art that many changes can be made in the details and arrangements of steps and parts without departing from the scope of the invention as defined in the appended claims.

What is claimed is:

1. A digitizer tablet and wireless stylus comprising:
said stylus having an elongated cylindrical body and a pocket clip attached to said body adjacent one end of said body;
said tablet including a housing having an elongated storage compartment therein which is accessible through an opening in said housing, said compartment being of a length sufficient to substantially completely store said stylus lengthwise within said storage compartment while exposing a portion of said stylus through said opening;
and a push-push latch mechanism comprising a keeper mounted in said storage compartment and a latch on said stylus, said mechanism being operable in response to pushing said stylus through said opening into said storage compartment to move said latch into engagement with said keeper to retain said stylus in said storage compartment, said mechanism being further operable in response to pushing said stylus while it is retained in said compartment to release said latch from said keeper and move said stylus outwardly from said storage compartment.

2. A digitizer tablet and wireless stylus in accordance with claim 1 wherein said pocket clip includes a cantilever spring having one end anchored to said body and a free end upon which said latch is mounted so as to bias said latch towards said body.

3. A digitizer tablet and wireless stylus in accordance with claim 2 wherein:
said storage compartment comprises a storage tube extending from said opening into said housing, said storage compartment further comprising a cam attached to said housing and extending through said opening into said storage tube for guiding said stylus into and out of said storage compartment.

4. A digitizer and wireless stylus in accordance with claim 3 wherein:
said cam comprises a ring shaped head fitted into said opening in said housing, said head having a second opening therein comprising a semicircular portion for guiding said stylus body and a U-shaped portion for passing said pocket clip into and out of said storage compartment, said cam further having a web longitudinally spaced from said head and supported by two side walls extending between said head and said web, said web having a semicircular radially inner surface for guiding a semicircular portion of said body of said stylus including a portion towards which said latch is biased.

5. A digitizer tablet and wireless stylus in accordance with claim 4 wherein:

said keeper is formed on said web;

and said cam further including cam track means on said web, said cam track means being engageable with said latch to guide said latch into and out of engagement with said keeper in response to said stylus being moved into and out of said storage position.

6. A digitizer and wireless stylus in accordance with claim 5 wherein:

said keeper and said cam track means are formed on a surface of said web which surface is located radially outwardly from said semicircular radially inner surface;

and said cam track means comprises a beveled edge for lifting said latch from said body of said stylus against the bias of said cantilever spring.

7. A digitizer and wireless stylus in accordance with claim 6 wherein:

said keeper is located in a laterally central position on said cam;

and said cam track means includes an entrance path extending along one side of said keeper for guiding said latch to said keeper and an exit path extending along another side of said keeper for guiding said latch away from said keeper.

8. A digitizer and wireless stylus in accordance with claim 7 comprising:

biasing means mounted in said storage compartment and being engageable with said stylus as said latch is guided by said cam track means, to bias said latch and stylus longitudinally outwardly from said storage compartment;

and said entrance path comprises a first stop wall limiting inward movement of said latch, said stop wall being located to one side of said keeper and longitudinally inwardly from said keeper, an entrance ramp extending from said beveled edge towards said first stop wall for guiding said latch thereto, a first cam wall extending from said stop wall to said keeper and across said entrance ramp for guiding said latch from said first stop wall to said keeper, and laterally facing side walls to move said latch laterally and thereby rotate said stylus as it moves along said entrance path;

said biasing means being compressible to allow said latch to be moved against said first stop wall in response to pushing said stylus into said storage compartment, said biasing means being operative in response to said stylus being released after said latch has been pushed against said first stop wall to move said latch along said first cam wall into engagement with said keeper, whereby said latch is held by said keeper under the bias of said biasing means.

9. A digitizer and wireless stylus in accordance with claim 8 wherein:

said exit path comprises a second stop wall limiting inward movement of said latch, said second stop wall being located to another side of said keeper and longitudinally inwardly from said keeper, an exit ramp extending from said second stop wall towards said beveled edge for guiding said latch thereto, a second cam wall extending from said keeper to said second stop wall for guiding said latch from said keeper to said second stop wall in response to said stylus being pushed inwardly from said storage position, and laterally facing side walls to move said latch laterally and thereby rotate said stylus as it moves along said exit path;

said biasing means being operative in response to said stylus being released after said latch has been pushed against said second stop wall to move said latch along said exit ramp and thereby move said stylus outwardly from said storage compartment.

10. A digitizer and wireless stylus in accordance with claim 2 wherein:

said housing comprises a base and opposed side wide wall extending upwardly from said base, said side walls having aligned openings therein;

and said storage compartment comprises a storage tube mounted on said base and extending between said openings, and first and second cams attached to said side walls and extending through said openings into said storage tube, whereby said stylus can be selectively inserted by a user into either end of said storage compartment.

11. A digitizer and wireless stylus in accordance with claim 10 wherein:

each cam comprises a ring shaped head fitted into one of said openings in said side walls, said head having a second opening therein comprising a semicircular portion for guiding said stylus body and a U-shaped portion for passing said pocket clip into and out of said storage compartment, said each cam further having a web longitudinally spaced from said head and supported by two side walls extending between said head and said web, said web having a semicircular radially inner surface for guiding a semicircular portion of said body of said stylus including a portion towards which said latch is biased.

12. A digitizer tablet and wireless stylus in accordance with claim 11 wherein:

in each said cam, said keeper is formed on said web;

and each said cam further including cam track means on said web, said cam track means being engageable with said latch to guide said latch into and out of engagement with said keeper in response to said stylus being moved into and out of said storage position.

13. A digitizer and wireless stylus in accordance with claim 12 wherein:

said keeper and said cam track means are formed on a surface of said web which surface is located radially outwardly from said semicircular radially inner surface;

and said cam track means comprises a beveled edge for lifting said latch from said body of said stylus against the bias of said cantilever spring.

14. A digitizer and wireless stylus in accordance with claim 13 wherein:

said keeper is located in a laterally central position on said cam;

and said cam track means includes an entrance path extending along one side of said keeper for guiding said latch to said keeper and an exit path extending along another side of said keeper for guiding said latch away from said keeper.

15. A digitizer and wireless stylus in accordance with claim 14 comprising:

biasing means mounted in said storage compartment and being engageable with said stylus as said latch is guided by said cam track means, to bias said latch and stylus longitudinally outwardly from said storage compartment;

and said entrance path comprises a first stop wall limiting inward movement of said latch, said stop wall being located to one side of said keeper and longitudinally inwardly from said keeper, an entrance ramp extending from said beveled edge towards said first stop wall for guiding said latch thereto, a first cam wall extending from said stop wall to said keeper and across said entrance ramp for guiding said latch from said first stop wall to said keeper, and laterally facing side walls to move said latch laterally and thereby rotate said stylus as it moves along said entrance path;

said biasing means being compressible to allow said latch to be moved against said first stop wall in response to pushing said stylus into said storage compartment, said biasing means being operative in response to said stylus being released after said latch has been pushed against said first stop wall to move said latch along said first cam wall into engagement with said keeper, whereby said latch is held by said keeper under the bias of said biasing means.

16. A digitizer and wireless stylus in accordance with claim 15 wherein:

a second stop wall limiting inward movement of said latch, said second stop wall being located to another side of said keeper and longitudinally inwardly from said keeper, an exit ramp extending from said second stop wall towards said beveled edge for guiding said latch thereto, a second cam wall extending from said keeper to said second stop wall for guiding said latch from said keeper to said second stop wall in response to said stylus being pushed inwardly from said storage position, and laterally facing side walls to move said latch laterally and thereby rotate said stylus as it moves along said exit path;

said biasing means being operative in response to said stylus being released after said latch has been pushed against said second stop wall to move said latch along said exit ramp and thereby move said stylus outwardly from said storage compartment.

17. A digitizer and wireless stylus in accordance with claim 15 wherein:

said biasing means comprises a compression spring mounted in said storage tube and two movable pistons mounted in said storage tube at each end of said compression spring, each piston being engageable with said stylus.

18. A digitizer and wireless stylus in accordance with claim 17 wherein:

wherein said stylus includes an axial tip at one end;

and each piston includes an axial hole larger that said axial tip of said stylus thereby allowing said axial tip to freely pass through such piston while other portions of said piston engage said stylus.

* * * * *